United States Patent
Islam et al.

(10) Patent No.: US 10,164,488 B2
(45) Date of Patent: Dec. 25, 2018

(54) BRUSHLESS MOTOR HAVING A PERMANENT MAGNET ROTOR

(71) Applicant: Steering Solutions IP Holding Corporation, Saginaw, MI (US)

(72) Inventors: Mohammed R. Islam, Saginaw, MI (US); Kenneth P. Webber, Saint Charles, MI (US); Delynn M. Streng, Freeland, MI (US); Christopher J. Sommer, Swartz Creek, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 295 days.

(21) Appl. No.: 14/814,770

(22) Filed: Jul. 31, 2015

(65) Prior Publication Data

US 2016/0079816 A1   Mar. 17, 2016

Related U.S. Application Data

(60) Provisional application No. 62/031,502, filed on Jul. 31, 2014.

(51) Int. Cl.
*H02K 1/27* (2006.01)
*H02K 1/28* (2006.01)

(52) U.S. Cl.
CPC .............. *H02K 1/278* (2013.01); *H02K 1/276* (2013.01); *H02K 1/28* (2013.01)

(58) Field of Classification Search
CPC ................................. H02K 1/278; H02K 1/28
USPC ....................... 310/156.08, 156.12
See application file for complete search history.

(56) References Cited

U.S. PATENT DOCUMENTS

| | | | | |
|---|---|---|---|---|
| 4,464,596 A | * | 8/1984 | Miller | H02K 1/276 310/156.52 |
| 2008/0088193 A1 | * | 4/2008 | Tervaskanto | H02K 1/276 310/156.22 |
| 2010/0026123 A1 | * | 2/2010 | Feng | H02K 1/28 310/156.08 |
| 2011/0291498 A1 | * | 12/2011 | Sakata | H02K 1/278 310/43 |
| 2012/0133225 A1 | | 5/2012 | Mizuike | |

(Continued)

FOREIGN PATENT DOCUMENTS

| CN | 1933286 A | 3/2007 |
|---|---|---|
| CN | 102035336 A | 4/2011 |

(Continued)

OTHER PUBLICATIONS

Machine Translation, Nakanishi, JP 2001008390 A, dated Jan. 2001.*

(Continued)

*Primary Examiner* — Thomas Truong
(74) *Attorney, Agent, or Firm* — Cantor Colburn LLP

(57) ABSTRACT

A brushless motor includes a stator disposed along an axis and a rotor disposed radially inward from the stator. The rotor includes a core, a plurality of first magnets and a plurality of second magnets configured to have opposite poles relative to the plurality of first magnets. The plurality of first and second magnets may each have a substantially rectangular cross-section and are in contact with a substantially flat surface carried by the core that faces radially outward.

16 Claims, 4 Drawing Sheets

(56) References Cited

U.S. PATENT DOCUMENTS

| | | | |
|---|---|---|---|
| 2013/0106207 A1 | 5/2013 | Song et al. | |
| 2013/0207508 A1* | 8/2013 | Tomohara | H02K 1/2766 310/216.092 |
| 2014/0028119 A1* | 1/2014 | Sagalovskiiy | H02K 1/278 310/43 |

FOREIGN PATENT DOCUMENTS

| | | |
|---|---|---|
| CN | 102315708 A | 1/2012 |
| CN | 102780288 A | 11/2012 |
| CN | 102790455 A | 11/2012 |
| CN | 103872818 A | 6/2014 |
| DE | 10016002 A1 | 11/2000 |
| EP | 0043981 A1 | 1/1982 |
| EP | 0410048 A2 | 1/1991 |
| EP | 1780870 A1 | 5/2007 |
| EP | 2395631 A1 | 12/2011 |
| JP | 2001008390 A * | 1/2001 |
| JP | 2004023944 A | 1/2004 |
| JP | 2010187427 A | 8/2010 |
| WO | 0111756 A1 | 2/2001 |
| WO | 2006067275 A1 | 6/2006 |
| WO | 2011090394 A1 | 7/2011 |
| WO | 2013081703 A2 | 6/2013 |

OTHER PUBLICATIONS

Extended Search Report for related EP Application No. 15179134.0 dated Jun. 1, 2016, 10 pages.

Translation of Chinese Office Action for application No. 201510560798.X dated May 27, 2017, 18 pages.

English Translation of Chinese Office Action and Supplementary Search Report for Chinese Application No. 201510560798.X dated Jun. 20, 2018, 9 pages.

* cited by examiner

BRUSHLESS MOTOR HAVING A PERMANENT MAGNET ROTOR

CROSS-REFERENCES TO RELATED APPLICATIONS

This patent application claims priority to U.S. Provisional Patent Application Ser. No. 62/301,502, filed Jul. 31, 2014 which is incorporated herein by reference in its entirety.

BACKGROUND OF THE INVENTION

The present disclosure relates to brushless motors and more particularly to rotors of the brushless motors.

For brushless PM motors, the cost of the permanent magnet depends on the shape of the magnet, and is also a function of the amount of finishing operation needed on the magnets. Surface mounted permanent magnets (SPM) with arc shape are desired to obtain lower cogging torque, lower BEMF harmonics and hence less torque ripple in the motor. Arc magnets (ring type or segment type which could be straight segment or skewed segment) need significant grinding to maintain tighter tolerances if the application requires low ripple performances. These magnets have lower material yield and thus the unit cost is higher too.

Interior permanent magnet (IPM) rotor designs with rectangular shaped magnets may thus be desirable to offset scrap cost and increase material yield. However, due to the shape of the magnet, the motor performance in regards to cogging, harmonics, ripple and thus noise are not ideal. Further, the magnets being located inside the rotor core and the traditional methods of cogging and harmonic cancellation through step skew, make the magnets and rotors in particular, difficult to manufacture. Hence, active cancellation of cogging torque and torque ripple is necessary. Moreover, active cancellation of cogging torque requires some voltage budget for cancellation which may negatively impacts the size of the motor.

Accordingly, improved rotor design is desirable to reduce manufacturing cost and improve torque efficiency and magnet retention.

SUMMARY OF THE INVENTION

In one embodiment of the present disclosure, a brushless motor includes a stator disposed along an axis and a rotor disposed radially inward from the stator. The rotor includes a core, a plurality of first magnets and a plurality of second magnets configured to have opposite poles relative to the plurality of first magnets. The plurality of first and second magnets may each have a substantially rectangular cross-section and are in contact with a substantially flat surface carried by the core that faces radially outward.

In another embodiment of the present disclosure, a brushless motor includes a stator disposed along an axis, and a rotor disposed radially inward from the stator. The rotor includes a core, a plurality of first magnets and a plurality of second magnets configured to have opposite poles relative to the plurality of first magnets. Each one of the plurality of first and second magnets includes first and second segments having the same pole, and disposed adjacent to and spaced circumferentially apart from one-another. Each one of a plurality of T-shaped retainers of the rotor are disposed circumferentially between respective first and second segments.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, FIGS. 1-5 describe various embodiments of a rotor design with permanent magnets, that may be rectangular, mounted to a core.

The present disclosure seeks to compromise between active cancellation with some form of passive cancellation in the motor design and making a motor cost effective from a manufacturing and a material utilization perspective. Various techniques for what may be an interior permanent magnet (IPM) motor exist to minimize the cogging torque and harmonics but at the expense of added complexity and output torque. Embodiments of the present disclosure include a simpler design technique to achieve these goals while keeping what may be a rectangular shaped magnet as is used in IPM brushless motors. Embodiments of the present disclosure illustrated in FIGS. 1-5 disclose a unique design associated with magnet retention in the rotor that uses low cost rectangular magnets, avoids complexity in the design to reduce cogging torque and also improves the torque output of the motor.

Figure 1:
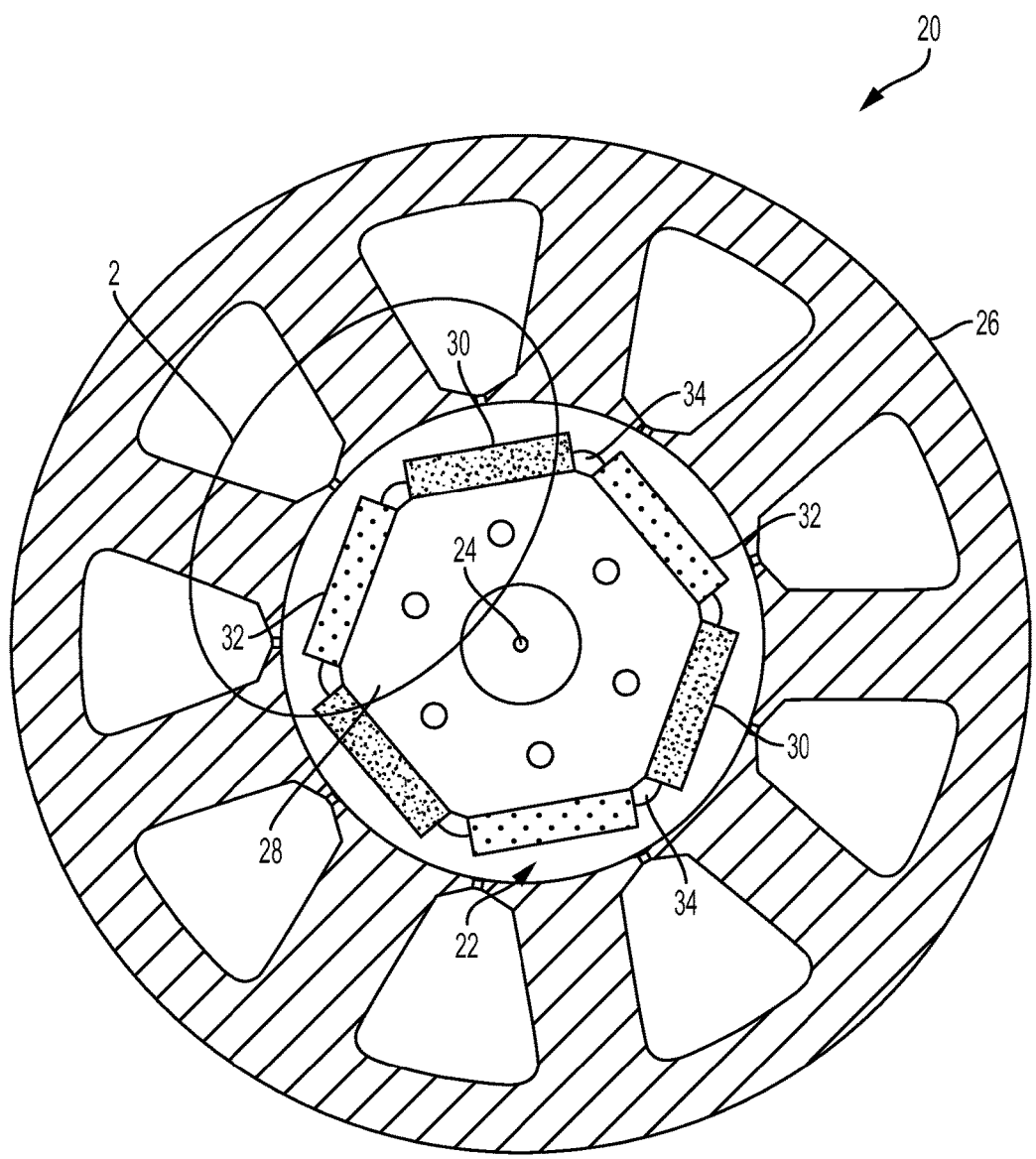
FIG. 1 illustrates a rotor cross-section in accordance with a brushless motor of the present disclosure.
Figure 2:
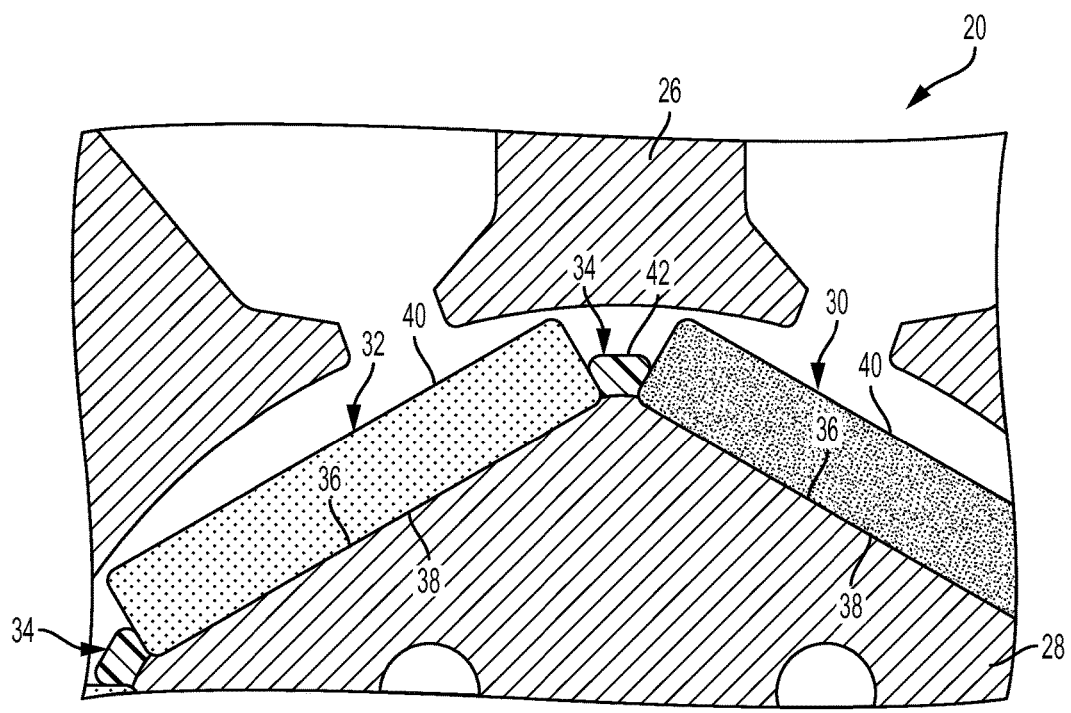
FIG. 2 illustrates a partial enlarged view of the rotor taken from circle 2 of FIG. 1.

More specifically and referring to FIGS. 1 and 2, a brushless motor 20 includes a rotor 22 disposed along a rotational axis 24 and a stator 26 concentrically located to, and disposed radially outward from, the rotor 22. The rotor 22 includes a core 28 general made of a steel-based material, a plurality of first magnets 30 (e.g., three illustrated), a plurality of second magnets 32 (e.g., three illustrated), and a plurality of ribs 34 that may extend axially. The first and second magnets 30, 32 are orientated such that they have opposite poles to one-another, and are alternatively distributed circumferentially about the core 28. The magnets 30, 32 may have a substantially rectangular cross section and are generally adhered, or otherwise engaged, to substantially flat surfaces 36 carried by the core 28. Each first magnet 30 is spaced circumferentially from the adjacent second magnet 32, with a respective rib of the plurality of ribs 34 located there-between.

Each magnet 30, 32 may have opposite and substantially flat faces 38, 40 with the face 38 facing radially inward and in contact with surface 36 of the core 28, and the opposite face 40 facing radially outward toward and in close proximity to the stator 26. Each rib 34 projects radially outward from the core 28 and includes a distal end 42 that is generally disposed radially inward from the face 40 of the magnets 30, 32. The ribs 34 may be non-magnetic, may be made of a polymer, and may be molded directly to the core 28, as one, non-limiting example. It is further contemplated and understood that the ribs 34 may be of a magnetic material and may further be an extension of the core; however, as a magnetic material there may be some flux leakage between opposite poles.

Using rectangular magnets 30, 32 on the core surface may benefit the motor design from both a cost and an effectiveness of passive cancellation. FIGS. 1 and 2 illustrate a 6-pole motor design but several different designs are contemplated including 8 or more poles. The brushless motor 20 may generally be a surface permanent magnet (SPM) motor.

Figure 3:
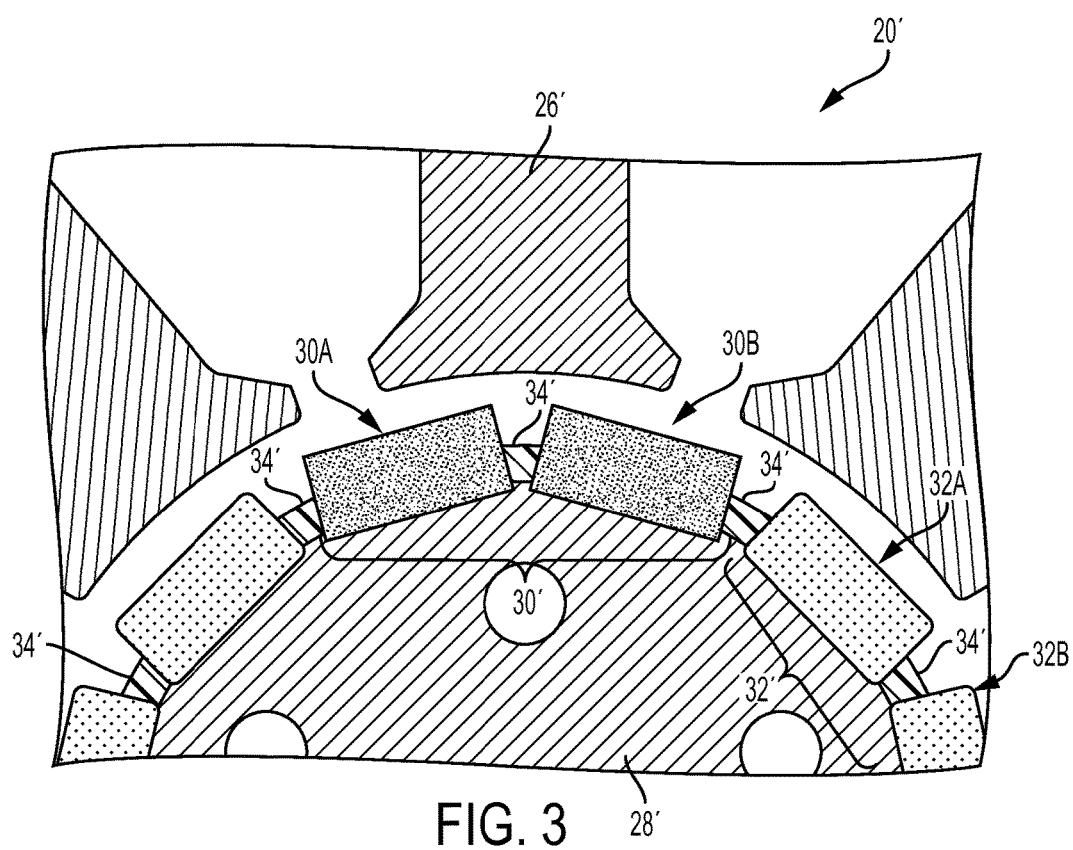
FIG. 3 illustrates a rotor cross-section in accordance with a second embodiment of a brushless motor.

Referring to FIG. 3, a second embodiment of a brushless motor is illustrated wherein like elements to the first embodiment have like identifying numerals except with the addition of a prime symbol suffix. A brushless motor 20' includes a plurality of magnets 30' each having first and second segments 30A, 30B of the same polarity, and a plurality of magnets 32' each having first and second segments 32A, 32B of the same polarity and opposite the first and second segments 30A, 30B polarity. The segments 30A, 30B of the first magnet 30' are circumferentially spaced from, and adjacent to, one-another (i.e., no other magnets located circumferentially there-between). Similarly, the segments 32A, 32B of the second magnet 32' are circumferentially spaced from, and adjacent to, one-another. Ribs 34' may be located circumferentially between the magnets 30', 32', between the segments 30A, 30B and between the segments 32A, 32B. The segments 30A, 30B, 32A, 32B may generally have a rectangular cross section. The motor 20' may be a SPM motor.

Figure 4:
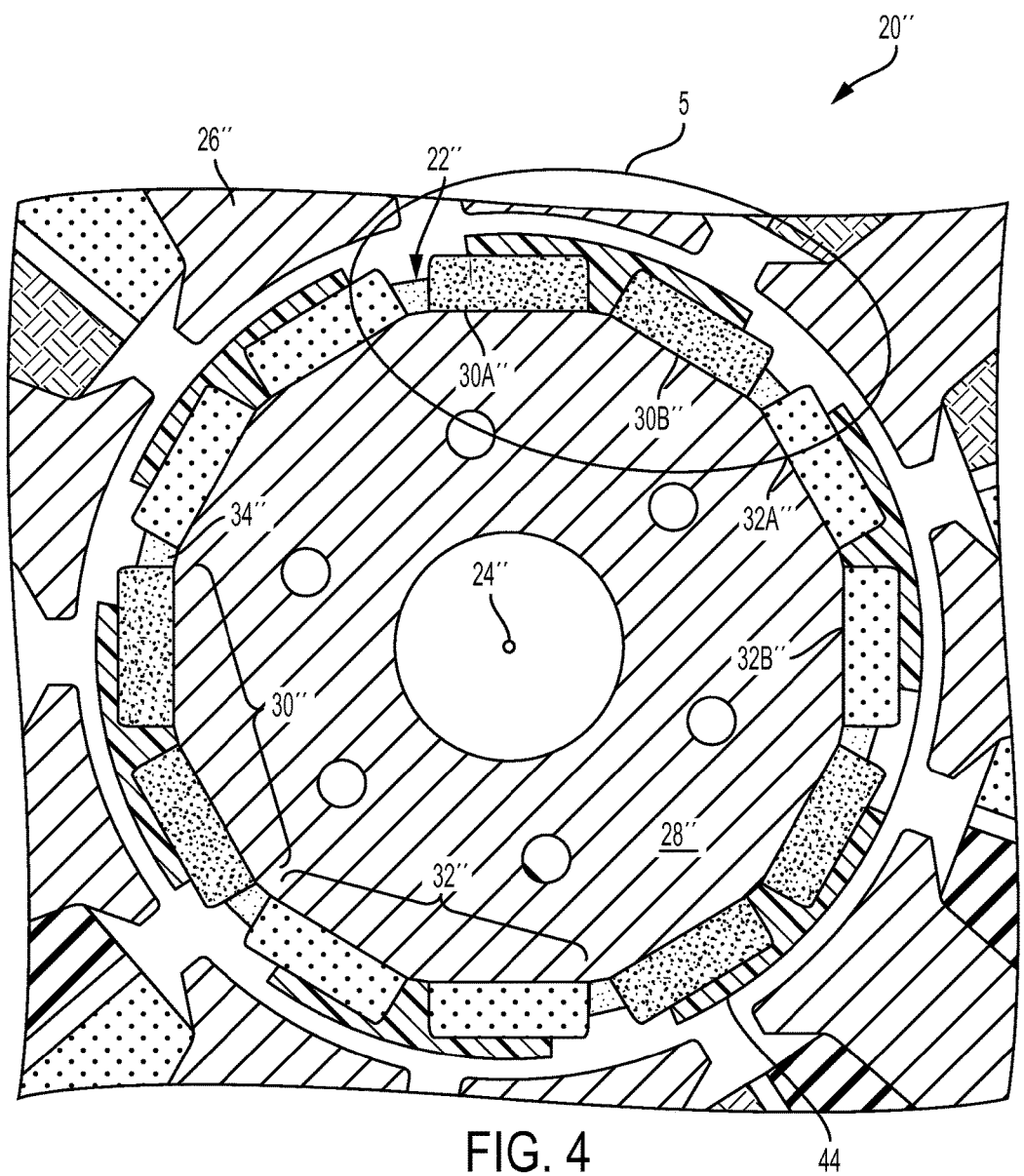
FIG. 4 illustrates a rotor cross-section in accordance with a third embodiment of a brushless motor.
Figure 5:
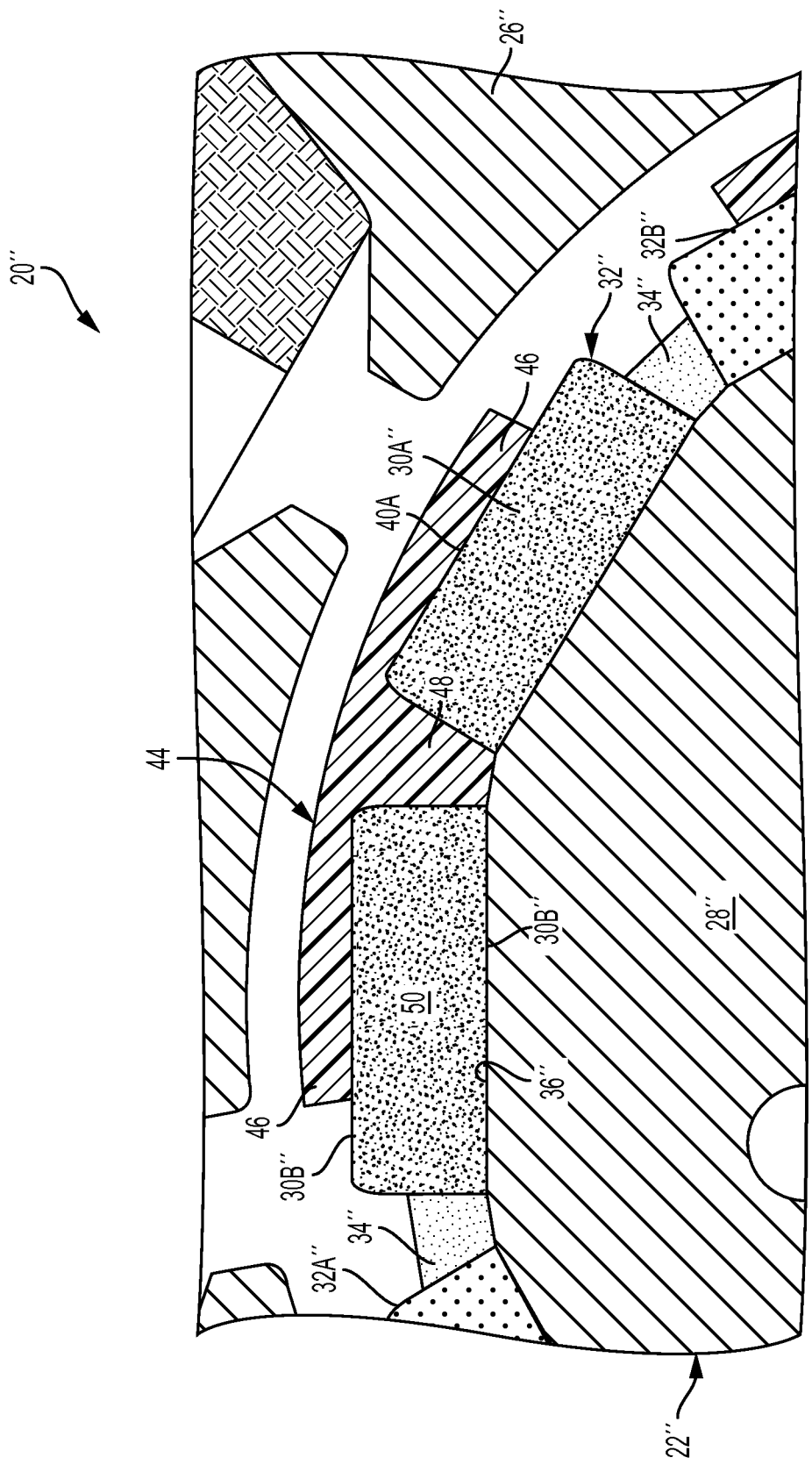
FIG. 5 illustrates a partial enlarged view of the rotor taken from circle 5 of FIG. 4.

Referring to FIG. 4, a third embodiment of a brushless motor is illustrated wherein like elements to the first embodiment have like identifying numerals except with the addition of a double prime symbol suffix. A brushless motor 20" may include first magnets 30" each having segments 30A", 30B", and second magnets 32" each having segments 32A", 32B". The first and second magnets 30", 32" are spaced circumferentially from one-another by a rib 34". The first and second segments 30A", 30B" may be separated by a retainer 44 that may be T-shaped. The first and second segments 32A", 32B" may also be separated by a similar retainer 44.

Each retainer 44 may include a flange portion 46 and a base portion 48, which is engaged to and spans radially between a core 28" of the rotor 22" and a midpoint of the flange portion 46. The flange portion 46 spans circumferentially and over (i.e. radially outward from) a portion of substantially flat faces 40A, 40B of the respective segments 30A", 30B" and the respective segments 32A", 32B". The retainers 44 may be made of a magnetic material (e.g., same material as the core). The retainers 44 may be cast with the core 28" and/or machined. The retainers 44 may further be manufactured separate from the core 28" and attached to the core via a mechanical means, welding, and/or other adherence.

The boundaries of an opening 50 for receipt of any one of the magnet segments 30A", 30B", 32A", 32B" may be defined by a flat surface 36" of the core 28", the retainer 44 and the rib 34". During assembly, the magnet segments 30A", 30B", 32A", 32B" may be mounted to the core 28" by sliding the segments 30A", 30B", 32A", 32B" in a substantially axial direction and through the opening 50.

Because manufacturing of the motor 20" does not require the more traditional over mold processes that create internal pressure, the bulging and breakage (i.e., typically at more traditional web locations) is avoided. By bridging the segments 30A", 30B" of magnet 30" and bridging the segments 32A", 32B" of magnet 32" with the retainers 44, passive cancellation with a step skewed rotor 22" is easier since the magnets 30", 32" are closer to or at the outer rotor face. Moreover, the bulging and breaking problems with more traditional IPM motors at web locations is eliminated with the T-shaped retainer design. Yet further, the more traditional web is completely eliminated with use of the T-shaped retainer 44. Because the ribs 34" of the present disclosure generally replace the more traditional bridges made of the core material, there is no flux shorting bridge between opposite poles, rather the T-shaped retainer 44 facilitates concentration of the flux from the magnets belonging to the same pole. Advantageously, magnet retention of the motor 20" is about as good as magnet retention for more traditional IPM motors.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A brushless motor comprising:
    a stator disposed along an axis; and
    a rotor disposed radially inward from the stator, and including a core, a plurality of first magnets and a plurality of second magnets configured to have opposite poles relative to the plurality of first magnets, each one of the plurality of first and second magnets including first and second segments disposed circumferentially adjacent to and spaced circumferentially apart from one-another, each of the first and second segments having a substantially rectangular cross-section and being in contact with a respective substantially flat surface of a plurality of flat surfaces facing radially outward and carried by the core, and wherein the rotor includes a plurality of T-shaped retainers disposed circumferentially between the first and second segments, and a plurality of ribs projecting radially outward from the core and distributed circumferentially between each one of the plurality of first and second magnets such that the plurality of ribs circumferentially alternate with the plurality of T-shaped retainers.

2. The brushless motor set forth in claim 1, wherein each one of the T-shaped retainers include a flange portion spanning circumferentially over a portion of the first and second segments of each one of the plurality of first and second magnets, and a base portion engaged to and projecting radially between the core and the flange portion.

3. The brushless motor set forth in claim 1, wherein the plurality of first and second magnets project radially outward at least as far as the plurality of ribs.

4. The brushless motor set forth in claim 3, wherein the plurality of ribs are non-magnetic.

5. The brushless motor set forth in claim 4, wherein the plurality of T-shaped retainers are made of a magnetic material, and the plurality of ribs are made of a polymer material and molded to the core.

6. The brushless motor set forth in claim 4, wherein the core, a T-shaped retainer of the plurality of T-shaped retainers and a rib of the plurality of ribs generally define an opening for axial insertion of one of the first and second segments of one of the plurality of first and second magnets.

7. A brushless motor comprising:
a stator disposed along an axis; and
a rotor disposed radially inward from the stator, and including a core, a plurality of first magnets and a plurality of second magnets configured to have opposite poles relative to the plurality of first magnets, each one of the plurality of first and second magnets including first and second segments disposed adjacent to and spaced circumferentially apart from one-another, and wherein the rotor includes a plurality of T-shaped retainers with each one directly disposed circumferentially between respective first and second segments, and a plurality of ribs projecting radially outward from the core and distributed circumferentially between each one of the plurality of first and second magnets for magnet retention, wherein each one of the plurality of ribs circumferentially alternate with each one of the plurality of T-shaped retainers.

8. The brushless motor set forth in claim 7, wherein each one of the T-shaped retainers include a flange portion spanning circumferentially over a portion of the first and second segments of each one of the plurality of first and second magnets, and a base portion engaged to and projecting radially between the core and the flange portion.

9. A rotor adapted to rotate about an axis and disposed radially inward from a stator of a brushless motor, the rotor comprising:
a core;
a plurality of magnet paired segments spaced circumferentially about and disposed radially outward from the core;
a plurality of T-shaped retainers in contact with and projecting radially outward from the core, each one of the plurality of T-shaped retainers being disposed circumferentially between first and second segments of each respective paired segments of the plurality of magnet paired segments; and
a plurality of ribs in contact with and disposed circumferentially between each of the paired segments of the plurality of magnet paired segments such that the plurality of ribs and the plurality of T-shaped retainers alternate circumferentially.

10. The rotor set forth in claim 9, wherein the plurality of magnet paired segments are orientated as a plurality of first magnets and a plurality of second magnets with each one of the plurality of first magnets being disposed circumferentially between adjacent second magnets of the plurality of second magnets, and the plurality of first magnets have opposite poles relative to the plurality of second magnets.

11. The rotor set forth in claim 10, wherein the plurality of first and second magnets project radially outward and beyond the plurality of ribs.

12. The rotor set forth in claim 9, wherein each segment of the magnet paired segments of the plurality of magnet paired segments have a substantially rectangular cross-section and are in contact with a substantially flat surface carried by the core.

13. The rotor set forth in claim 9, wherein the rotor is a surface mounted permanent magnet rotor.

14. The rotor set forth in claim 9, wherein each segment of the magnet paired segments of the plurality of magnet paired segments are separate from one-another.

15. The rotor set forth in claim 9, wherein the plurality of ribs are made of a non-magnetic polymer engaged to the core made of a magnetic material.

16. The rotor set forth in claim 9, wherein the plurality of T-shaped retainers are separate and circumferentially spaced apart from one-another.

* * * * *